United States Patent [19]
Zankl et al.

[11] 3,760,491

[45] Sept. 25, 1973

[54] TOOL CHANGE MECHANISM

[75] Inventors: Frank Zankl; Earl R. Lohneis, both of Milwaukee, Wis.

[73] Assignee: Kearney & Trecker Corporation, West Allis, Wis.

[22] Filed: May 22, 1972

[21] Appl. No.: 255,408

[52] U.S. Cl.................................. 29/568, 214/1 BC
[51] Int. Cl............................................. B23q 3/157
[58] Field of Search ...................... 29/568; 214/1 BC

[56] References Cited
UNITED STATES PATENTS
3,591,920   7/1971   Brainard et al....................... 29/568
3,616,526   11/1971  Tajima................................. 29/568

*Primary Examiner*—Andrew R. Juhasz
*Assistant Examiner*—Z. R. Bilinsky
*Attorney*—Cyril M. Hajewski et al.

[57] ABSTRACT

A tool storage magazine containing a plurality of movable tool receptacles or cartridges that are movable to a tool change station. The cartridge and its associated tool at the tool change station is removable from the magazine by a pivotal carrier that is provided with a clamp which clamps the cartridge containing the selected tool to the pivotal carrier. The pivotal carrier then swings 90° to move the clamped cartridge with it for the purpose of positioning the axis of the selected tool in the cartridge parallel with the machine tool spindle. The pivotal carrier also carries a tool change arm movable to interchange the tool in the cartridge with the tool in the machine tool spindle. Upon completion of the 90° pivotal movement by the pivotal carrier, the tool change arm is actuated in its tool change cycle to insert the new tool from the cartridge into the spindle and the previously used tool from the spindle into the cartridge. The cartridge with the old tool in it is then returned to the tool storage magazine by a reverse pivotal movement of the carrier.

14 Claims, 15 Drawing Figures

TOOL CHANGE MECHANISM

BACKGROUND OF THE INVENTION

The present invention relates to the tool change mechanism art in which a plurality of tools for use at the work station of a machine tool are stored in a tool storage magazine. In mechanisms of this type, a tool transfer member is commonly provided for extracting the selected tool from the magazine and transferring it to the work station and for likewise removing the previously used tool from the work station and returning it to the magazine.

Tool change mechanisms of this type are well-known in the art but the use of such mechanism presents the problem of maintaining the work station clear after the tool change operation has been completed. To this end, the tool transfer member has been moved to a parked position to clear it from the work zone after the tool change operation has been accomplished. The position of the tool storage mechanism also presents a problem, particularly, if the magazine is designed to carry an appreciable number of tools. If the magazine is close enough to the work station to facilitate the tool change operation it may interfere with the work operation, and if the magazine is positioned remote from the work zone, the tool change cycle is complicated and the time to complete it is increased. A variety of solutions to these problems have been conceived. For example, two separate transfer members have been provided for transferring the tool between the work station and the magazine with the first transfer member extracting the selected tool from the magazine and transferring it to the ready position, and a second transfer member being provided to move the tool from the ready position to the work station.

The configuration of the machine tool itself may complicate the tool change operation. For example, the rotary tool carrying a spindle of a machine tool may be mounted in such a manner as to require a relatively long movement of the tool for transfer to the spindle. This may require a double transfer of the tool or an undesirably long tool transfer member.

It is therefore a general object of the present invention to provide an improved tool change mechanism of simple construction which operates with improved efficiency and completes the tool change operation in a minimum of time.

It is a further object to provide an improved tool change mechanism that is especially adapted to transfer a tool over relatively long distances and which will also change the angular position of the axis of the tool during the transfer operation so that its axis becomes parallel to the axis of a machine tool spindle prior to final positioning in the spindle.

It is another object of the present invention to provide an improved tool change mechanism of relatively simple construction which operates to leave the work station completely clear of any obstruction after the tool change operation is completed so that there is no interference with the work operation.

SUMMARY OF THE INVENTION

The tool change mechanism of the present invention includes a tool storage magazine carrying a plurality of tools and a tool transfer mechanism for transferring the tools from the magazine to the rotary cutter carrying spindle of the machine tool. The tool storage magazine is mounted on the side of the machine so that the axes of the tools are disposed 90° to the axis of the machine tool spindle. Each tool is carried in a separate removable cartridge and the cartridges are carried for movement in the magazine so that any one of the cartridges may be located at a tool change station where the cartridge and its associated tool may be removed from the machine as a unit.

The selected tool is moved to the tool change station and the cartridge in which it is carried is clamped to a pivotal carrier. When the tool change operation is initiated, the carrier is pivoted 90°, taking the selected tool and its cartridge with it. Such movement removes the cartridge from the magazine and serves the dual purpose of moving the selected tool closer to the spindle as well as to align the axis of the selected tool parallel to the axis of the spindle.

The pivotal carrier also carries a tool change arm and its operating mechanism. After the carrier has pivoted outwardly so that the axis of the selected tool is parallel to the axis of the spindle, the tool change arm is rotated so that one of its grips moves into engagement with the tool in the spindle and the other grip engages with the selected tool in the cartridge carried by the carrier. The tool change arm is then moved axially to its extended position to extract the two tools from the cartridge and spindle respectively, and is then rotated 180° to interchange the tools. The tool change arm is then retracted axially to insert the new tool in the spindle and the previously used tool into the cartridge. The carrier then swings back 90° to return the cartridge with the previously used tool therein to the tool storage magazine, and since the tool change arm is carried by the carrier, it moves with the carrier so that the work zone is cleared to avoid interference with the work operation.

The foregoing and other objects of this invention, which will become more fully apparent from the following detailed description, may be achieved by means of the exemplifying apparatus depicted in and set forth in this specification in connection with the accompanying drawings.

BRIEF DESCRIPTION OF THE DRAWINGS

FIG. 9 is a fragmentary plan view showing the relative positions of the tool change arm, with respect to the spindle and a tool clamped to the carrier when the latter is in the ready position;

FIG. 9A is a fragmentary plan view identical to that shown in FIG. 9 except that the tools in the spindle and the carrier have been interchanged to indicate the completion of a tool change operation; and FIGS. 10 to 10E inclusive are fragmentary perspective views showing the sequence of movements of the tool change arm in a tool change cycle to complete a tool change operation after the carrier has been moved to the ready position.

DESCRIPTION OF THE PREFERRED EMBODIMENT

GENERAL ARRANGEMENT

Figure 1:
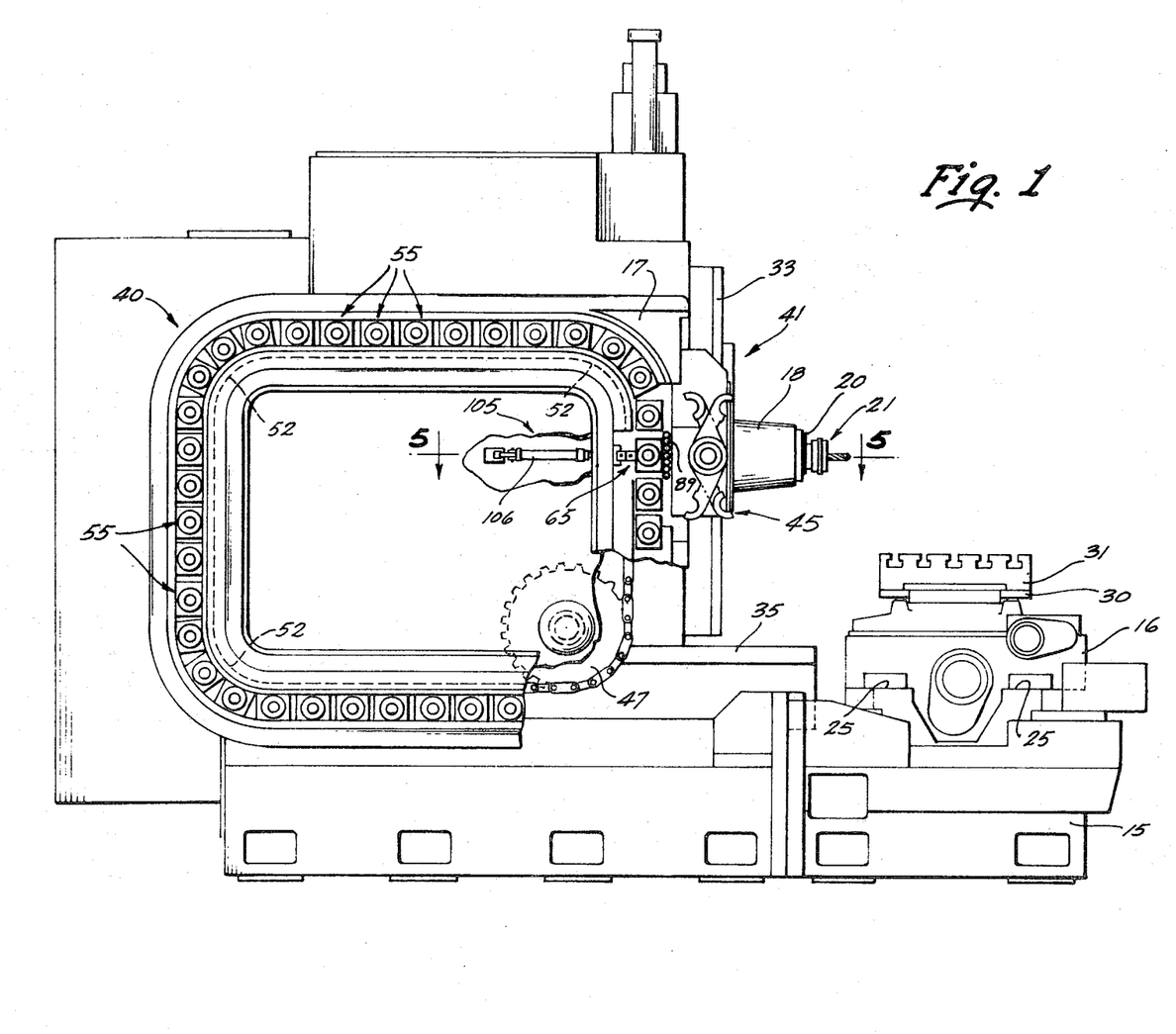
FIG. 1 is a view in side elevation illustrating a machine tool incorporating the improved tool change mechanism of the present invention, a portion of the machine being broken away to reveal a part of the operating mechanism for actuating the pivotal carrier.
Figure 2:
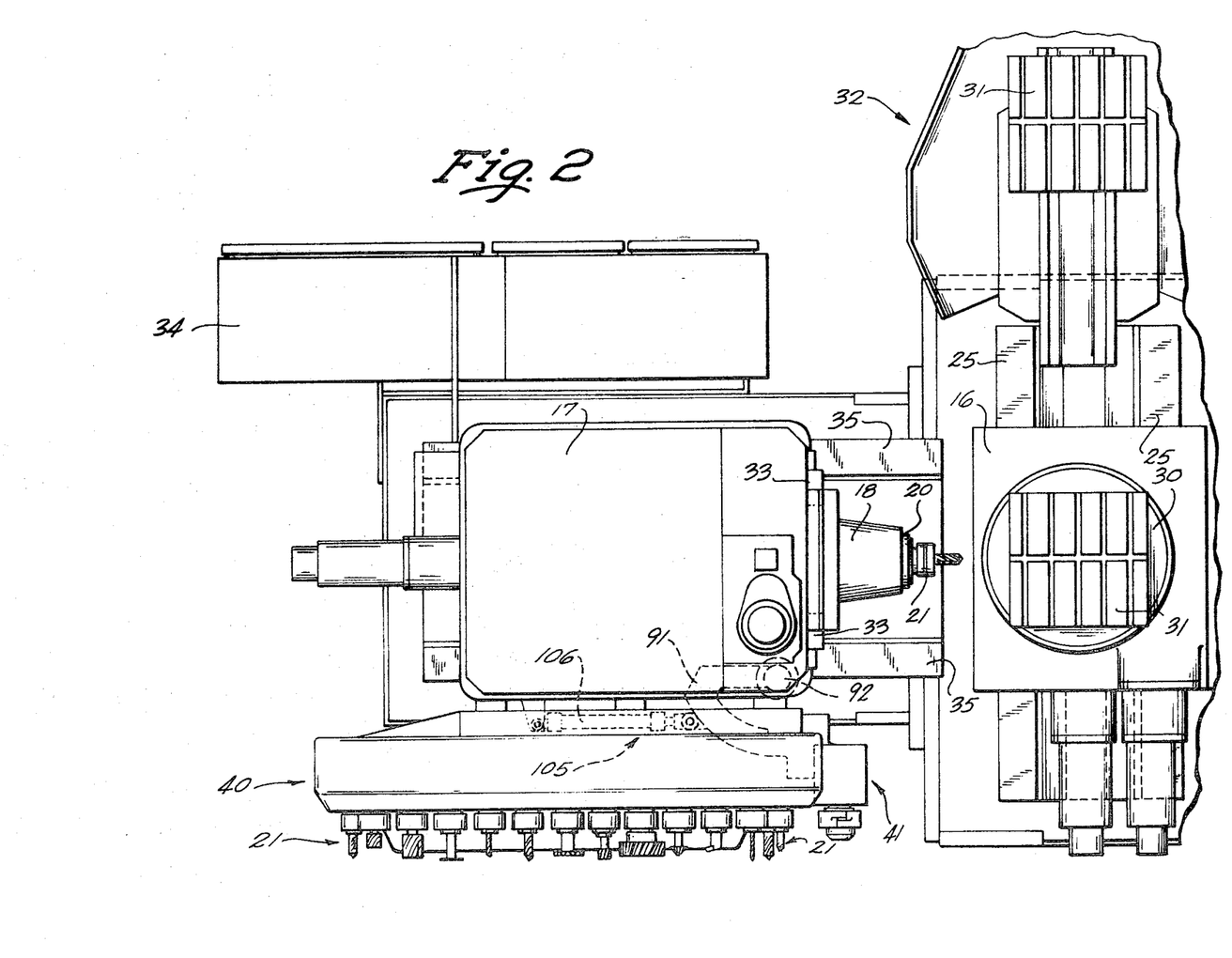
FIG. 2 is a plan view of the machine depicted in FIG. 1.

Reference is now made more particularly to the drawings and specifically to FIGS. 1 and 2 thereof which illustrate a machining center incorporating the improved tool change mechanism of the present invention. As there shown, the machine comprises a bed 15 which carries a work supporting table 16 at its forward end and an upright 17 at its rearward portion. The upright 17 operably supports a spindle head 18 which, in turn, rotatably supports a spindle 20 that is adapted to receive cutters 21 for performing a work operation. It should be understood that the cutting tools used in the illustrated machine are mounted in a standard toolholder which is adapted for reception in the spindle 20. In this description, the combination of the toolholder and its associated cutter will be referred to generally as a tool and will be identified by the reference numeral 21.

The table 16 is carried by the bed 15 for movement in a horizontal path of travel transverse to the axis of the spindle 20. This path of travel of the table 16 is commonly referred to in the art as the X axis of movement. To this end, the table 16 is carried on a pair of ways 25 that are mounted on the top surface of the bed 15 for sliding engagement with the bottom of the table 16.

A rotary table 30 is supported by the table 16 and is adapted to receive a pallet 31 on which the workpiece (not shown) to be operated upon is mounted. The machine includes a shuttle mechanism generally identified by the reference numeral 32 which serves to receive the pallet 31 containing the finished workpiece and presents a new pallet 31 containing a new workpiece for mounting on the rotary table 30. Shuttle arrangements for changing the workpieces on the rotary table 30 are well-known in the art and will not be explained here in detail.

The spindle head 18 is movable in a vertical path of travel normal to the path of travel of the table 16 along a path generally referred to as the Y axis of movement.

To this end, the upright 17 is provided with a pair of vertical ways 33 which are slidably engaged by cooperating ways (not shown) on the spindle head 18. The upright 17 is provided with a central opening for receiving the spindle head 18 with a way 33 being disposed on each side of the spindle head 18. Such construction is the most efficient type of support for a spindle head as it provides maximum rigidity and ultimate accuracy. On the other hand, this type of mounting increases the distance over which the tool 21 must be transported by the tool change mechanism and this disadvantage is obviated by the improved tool change mechanism of the present invention.

The upright 17 is movable in a horizontal path of travel transverse to the path of travel of the table 16 and which is commonly referred to in the art as the Z axis of travel. Accordingly, the rearward portion of the bed 15 presents a pair of ways 35 disposed for sliding engagement with cooperating ways formed on the underside of the upright 17. With this arrangement, the upright 17 is adated to move a tool 21 toward and away from a workpiece mounted on the rotary table 30.

Suitable power drive mechanisms are provided for actuating the table 16, spindle head 18 and upright 17 in their respective paths of travel along the X, Y and Z axes. In addition, a power drive means is provided for rotating the rotary table 30 with the pallet 31 mounted thereon to present a workpiece to the tool 21. All of these movements are preferably under the control of a numerical control circuit, portions of which are enclosed in the housing 34 illustrated in FIG. 2.

The tool change mechanism comprises a tool storage magazine generally identified by the reference numeral 40, a pivotal carrier 41, and a tool change arm generally identified by the reference numeral 45 which is mounted on the pivotal carrier 41 for movement therewith.

TOOL STORAGE MAGAZINE

Figures 5, 6:
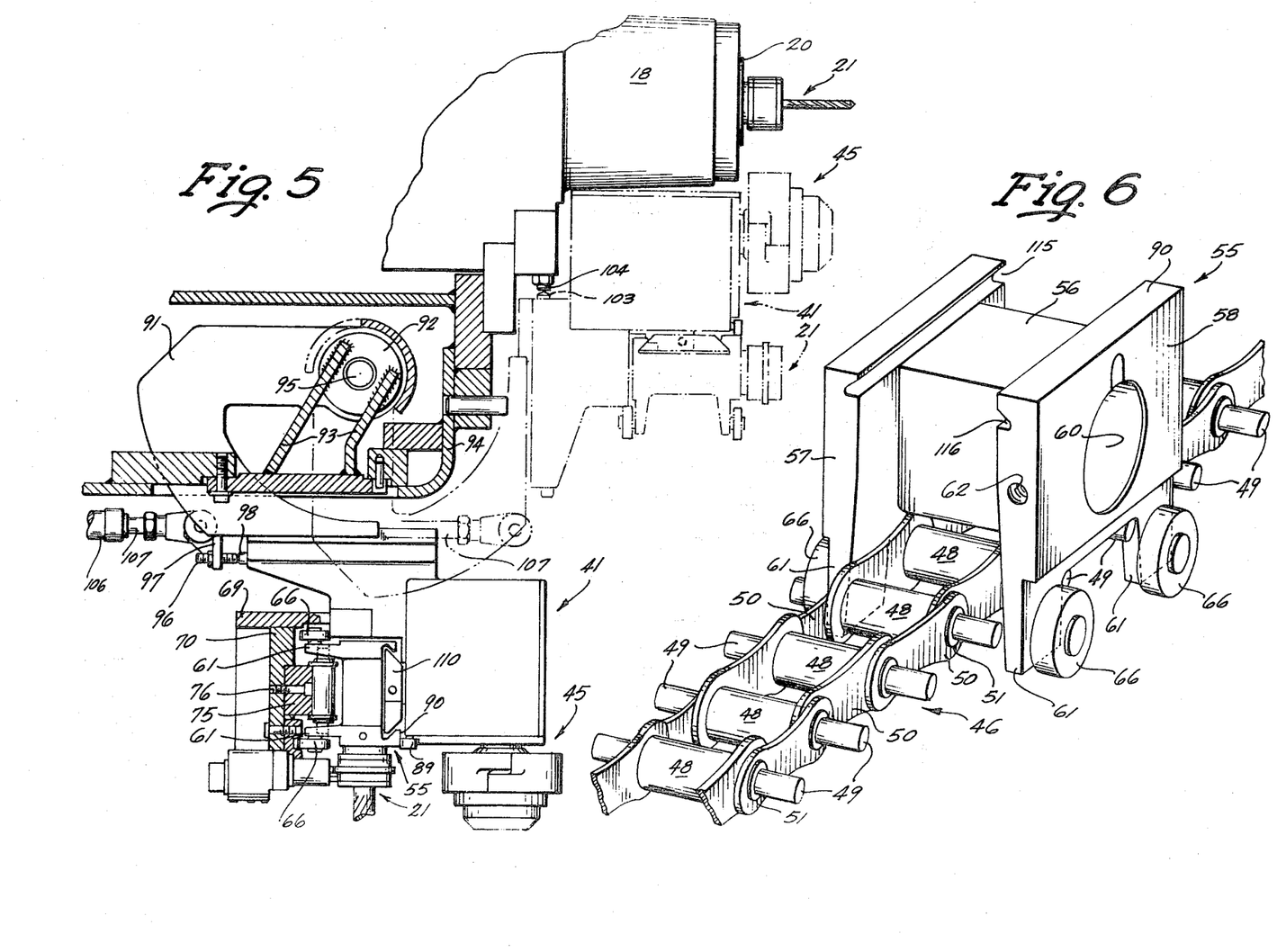
FIG. 5 is a detail view partly in plan and partly in horizontal section taken substantially along the plane represented by the line 5—5 in FIG. 1 and showing the movement of the pivotal carrier between its parked position and its ready position with the ready position being depicted by a broken line illustration.
FIG. 6 is a detail perspective view showing the driving connection between the chain and the tool cartridge in the tool storage magazine for moving the cartridge toward the tool change station.

The tool storage magazine 40 includes a sprocket chain generally identified by the reference numeral 46 and best shown in FIG. 6. The chain 46 is driven in its path of travel by a power driven sprocket 47 and three curved guides 52 are disposed at the three other corners of the rectangle to guide the chain 46 in the rectangular path of travel conforming to the configuration of the magazine 40 as illustrated in FIG. 1. The chain 46 is comprised of a plurality of central cylinders 48, FIG. 6, and reduced diameter pins 49 extend from both ends of each cylinder 48. The cylinders 48 with their cooperating pins 49 are connected to each other by links 50 that engage the shoulder formed by the juncture of the pins 49 with the larger diameter cylinders 48. Suitable snap rings 51 are provided for retaining the links 50 on the pins 49.

The pins 49, extending outwardly of the links 50, are provided for establishing a driving connection between the chain 46 and plurality of tool receptacles or cartridges generally identified by the reference numeral 55, one of which is best shown in FIG. 6, mounted on the chain 46. Each of the cartridges 55 includes a pair of side members 57 and 58 separated by a central block 56. The side members 57 and 58 are secured to the ends of the central block 56 and a hole 60 is bored through the side member 58 and the central block 56 for receiving the shank of a tool 21.

The side members 57 and 58 are each provided with two outwardly extending legs 61, with the legs on each side member being spaced in conformity with the spacing of the pins 49 so that when the cartridge is placed over the chain 46, the two legs 61 of each side member 57 and 58 will straddle a pair of pins 49 and will be in engagement with them. Thus, the two legs 61 of the side member 58 straddles two adjacent pins 49 of the chain 46, as clearly illustrated in FIG. 6, and the pins 49, extending from the opposite ends of the same cylinders 48, are straddled by the legs 61 of the side member 57. This connection of the legs 61 with the pins 49 serves as the driving connection between the chain 46 and the cartridge 55 for driving the latter in the established paths of travel of the chain 40. The block 56 is long enough to separate the side members 57 and 58 sufficiently so that the legs 61 of the side member 57 will be on the outside of the links 50 on one side of the chain 46, while the legs 61 of the side member 58 will be on the outside of the links 50 on the opposite side of the chain. With this arrangement, the cartridges 55 are securely coupled to the chain 46 to the driven by it, but the coupling can be conveniently disengaged by simply moving the cartridge away from the chain 46.

Within the wall of the bore 60 there is provided a threaded opening 62 for receiving a spring-urged detent mechanism (not shown) which yieldably retains the tools 21 in the bore 60. The spring-urged detent contained in the threaded opening 62 has sufficient force to retain the tools in the bore 60 while they are moving about the magazine 40 but will yield to permit ready extraction of the tool from the bore 60.

In FIG. 1, the tool storage magazine 40 is shown as fully supplied with cartridges 55 that are driven by the chain 46 in the manner described. The cartridges 55 are driven in the path of travel illustrated in FIG. 1 to a tool change station identified by the reference numeral 65. The cartridges 55 are retained in engagement with the chain 46 and in the tool storage magazine 40 during their entire path of travel except at the tool change station 65 where they are released for withdrawal from the magazine 40. It should be noted, that not only the tool 21 is removable from the magazine but its associated cartridge 55 as well.

Figure 7:
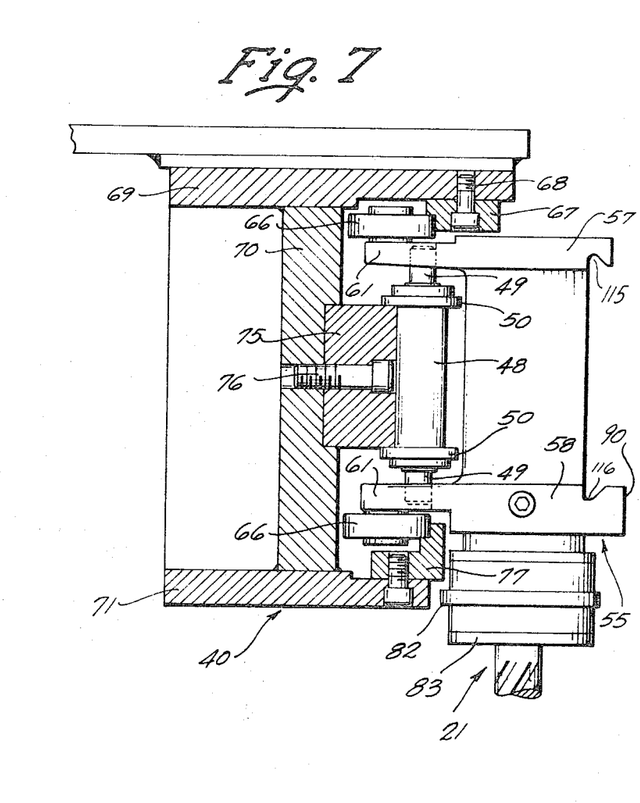
FIG. 7 is a detail view partly in plan and partly in horizontal section showing a tool cartridge disposed in the magazine at a position other than at the tool change station.

In order to render the cartridges 55 completely mobile about the designated path of travel in the tool storage magazine 40, each of the cartridges 55 is provided with four wheels 66, with one wheel being journalled on each of the legs 61. While the wheels 66 furnish mobility to the cartridge 55, they also serve as a means for retaining the cartridges 55 in the magazine. To this end, as clearly shown in FIG. 7, a rail 67 is secured in the interior side of the tool storage magazine 40.

The rail 67 is secured by a bolt 68 to a plate 69 that is carried by the upright 17. A web 70 extends laterally from the plate 69 toward the outside of the magazine 40 where it carries an outside plate 71. The I-shaped cross section formed by the inner plate 69, the web 70 and the outside plate 71 are shaped into a rectangular configuration with rounded corners to form the configuration of the magazine 40, as illustrated in FIG. 1, and to conform with the path of travel of the chain 46 as established by the disposition of the curved guides 52 and the drive sprocket 47.

In order to guide the chain in its desired path of travel, a guide member 75 is secured by bolts 76 to the web 70 and is of sufficient width to fit between the links 50 of the chain 46 so that the central cylinders 48 will roll upon the surface of the guide member 75.

The guide rail 67 extends laterally from the plate 69 so that it engages the periphery of the wheels 66 that are mounted on the side member 57. In like manner, a guide rail 77 extends inwardly from the outside plate 71 to overlie the periphery of the wheels 66 that are carried by the side member 58 of the cartridges 55. Thus, the four wheels 66 of the cartridges 55 roll along the guide rails 67 and 77 which retain the cartridges 55 in engagement with the chain 46 and prevent their withdrawal from the magazine 40 except at the tool change station 65.

Figure 8:
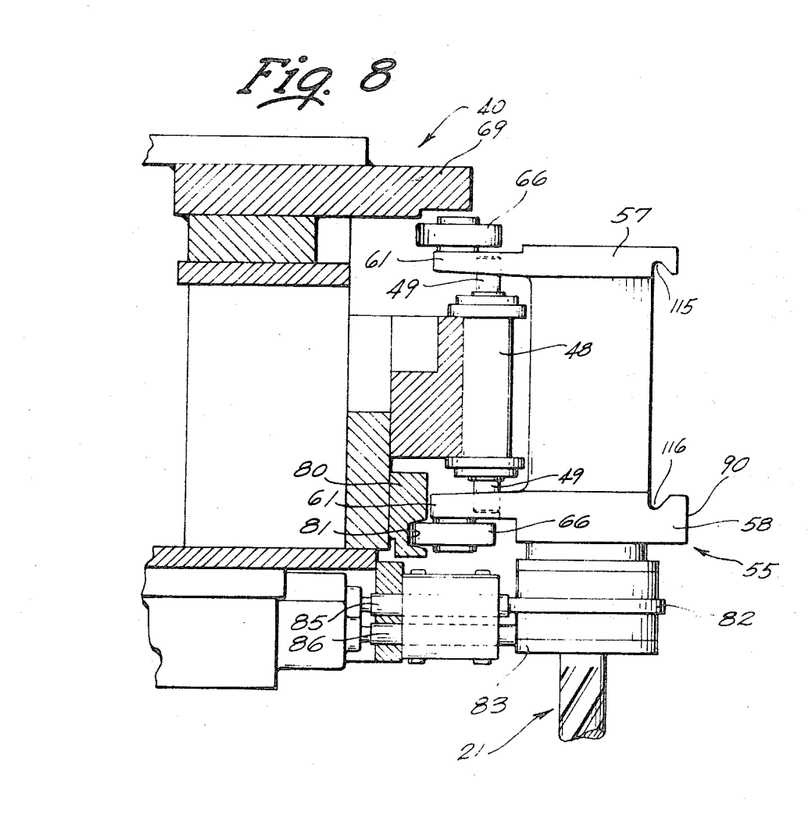
FIG. 8 is a detail view partly in plan and partly in horizontal section similar to the view in FIG. 7 except that the tool cartridge is illustrated in the tool storage magazine at the tool change station where it is removable from the magazine.

The view in FIG. 8 illustrates the construction of the tool storage magazine at the tool change station 65 where the rails 67 and 77 are interrupted to permit the withdrawal of the cartridges 55 from this portion of the tool storage magazine 40. It will be noted from the view in FIG. 8 that the legs 61 of the cartridge 55 at the tool change station remain in engagement with the pins 49, but since the rails 67 and 77 have been omitted at this portion of the tool storage magazine 40, the cartridge 55 can be readily withdrawn from engagement with the pins 49 by simply moving the cartridge away from the chain 46.

In order to retain the cartridge 55 in accurate alignment at the tool change station 65, a guide rail 80 having a groove 81 is provided for receiving the two wheels 66 that are carried by the side member 58 of the cartridge 55. The guide rail 80 is disposed at the tool change station only, and serves to replace the guide rails 67 and 77 as a guide member for positioning the cartridges 55. As a cartridge 55 enters the tool change station, the wheels 66 carried by the side member 58 engage the groove 81 so that undesirable displacement of the cartridge 55 is prevented.

Any of the well-known means for selecting the desired tool to be positioned at the tool change station 65 may be utilized. In the illustrated embodiment, the tools 21 are arranged in the tool storage magazine 40 in the sequence in which they are to be used for the machining cycle to be performed. Several groups of tools for different machining cycles may be stored in the magazine 40 at the same time, and the first tool of each group will be identified by a centrally disposed ring 82 carried on a collar 83 of the tool 21. The ring 82 will actuate a switch 85, as shown in FIG. 8, to indicate in the control system that the first tool of a new group of tools is located at the tool change station. The subsequent tools of this group will then be disposed in the tool storage magazine for reception at the tool change station 65 in the same sequence that they are to be used in the machining cycle. The presence of the next tool at the tool change station 65 is sensed by a switch 86 which is actuated by the collar 83 of the tool 21 when it arrives in position at the tool change station. Actuation of the switch 86 transmits a signal to the control circuit to stop the actuation of the chain 46 so that the next tool will be located at the tool change station for transfer to the spindle 20. At any point in the operation of the machine, the program may call for a new group of tools and the tools in the magazine will move past the tool change station until a tool with the ring 82 arrives at the tool change station 65 to indicate the presence of a new group of tools.

PIVOTAL CARRIER

The pivotal carrier 41 is shown in solid lines at its parked position in FIG. 5 and it is pivotable from that position to the ready position depicted by the broken line illustration in FIG. 5. Although the cartridges 55 are released at the tool change station for removal from the magazine, they are retained in position in the magazine 40 at the tool change station by the carrier 41 while it is in its parked position. Whenever the tool storage magazine is actuated for moving the cartridges 55 in their paths of travel, the pivotal carrier 41 is in the parked position so that it prevents the displacement of the cartridges from the tool storage magazine at the tool change station 65. To this end, the carrier 41 is provided with a plurality of rollers 89 that are engaged by an edge 90 of the side member 58 as the cartridges 55 pass through the tool change station. The rollers 89 serve to keep the wheels 66 in engagement with the groove 81 of the guide rail 80 so that the cartridge 55 remains accurately aligned in the tool change station.

The carrier 41 is supported by a curved bracket 91 which is journalled in a bearing 92 that is carried by webs 93 that extend from a bracket 94 secured to the upright 17. The bracket 91 is pivotable about an axis 95 for pivoting the carrier 41 between its parked position and its ready position, both of which are illustrated in FIG. 5. An adjusting screw 96 is threaded in a fixed plate 97 for engagement by a bumper 98 that is mounted for movement with the carrier 41. The abutment of the bumper 98 against the end of the screw 96 serves to establish the parked position of the carrier 41. The ready position of the carrier 41 is established by a bumper 103 moving into engagement with an adjusting screw 104 that is threaded into a structural member of the upright 17. The adjusting screws 96 and 104 can be adjusted to establish the exact desired position of the carrier 41 in its ready position and parked position, respectively.

The carrier 41 is actuated in its pivotal movement by a piston and cylinder mechanism generally identified by the reference numeral 105 in FIG. 1. The piston and cylinder mechanism 105 includes a cylinder 106 having one end fixed by a pin to a stationary member of the upright 17 and a piston rod 107, shown in FIG. 5, extendible from the cylinder 106. The piston rod is connected by a suitable linkage to the bracket 91, as illustrated in FIG. 5, for actuating the carrier 41 in its pivotal movement. When the piston rod 107 is extended from the cylinder 106, the carrier 41 is moved into its ready position, illustrated by the broken lines in FIG. 5. On the other hand, when the piston rod 107 is retracted into the cylinder 106, the carrier 41 is moved from the ready position to its parked position, as depicted by the solid lines in FIG. 5.

The pivotal movement of the carrier 41 from its parked position to its ready position serves to extract the cartridge 55 at the tool change station from the magazine to position it and its associated tool 21 adjacent to the spindle 20, and also re-orientates the carrier and the tool 90° in preparation for an interchange of tools. The tool 21 is then parallel to the spindle 20 to facilitate the tool interchange operation to be performed by the tool change arm 45.

Figure 3:
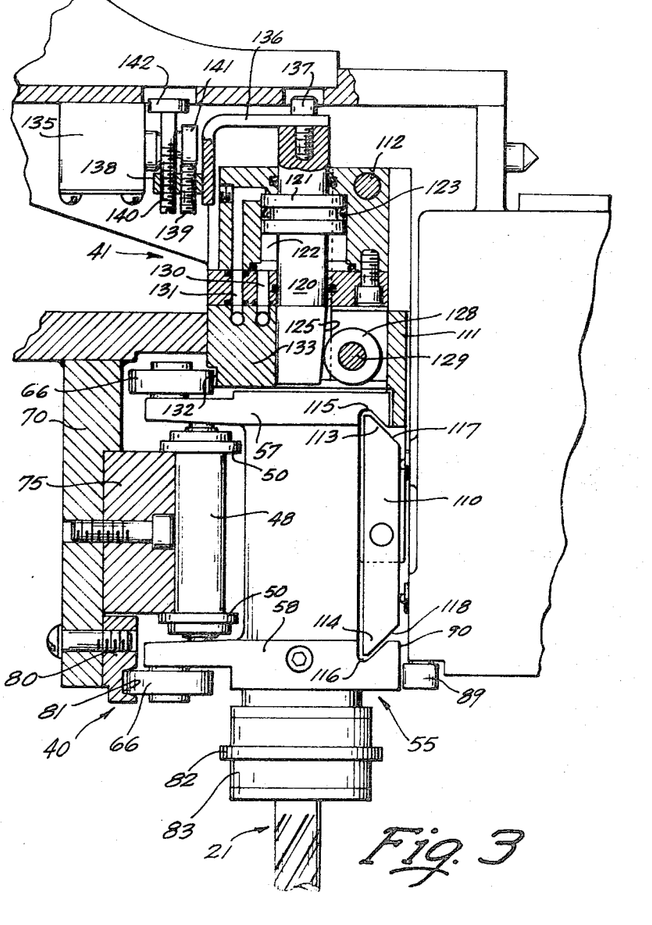
FIG. 3 is a detail view partly in plan and partly in horizontal section showing the clamping mechanism for securing the cartridge with the selected tool to the pivotal carrier at the tool change station with the clamping mechanism being shown in the released condition.
Figure 4:
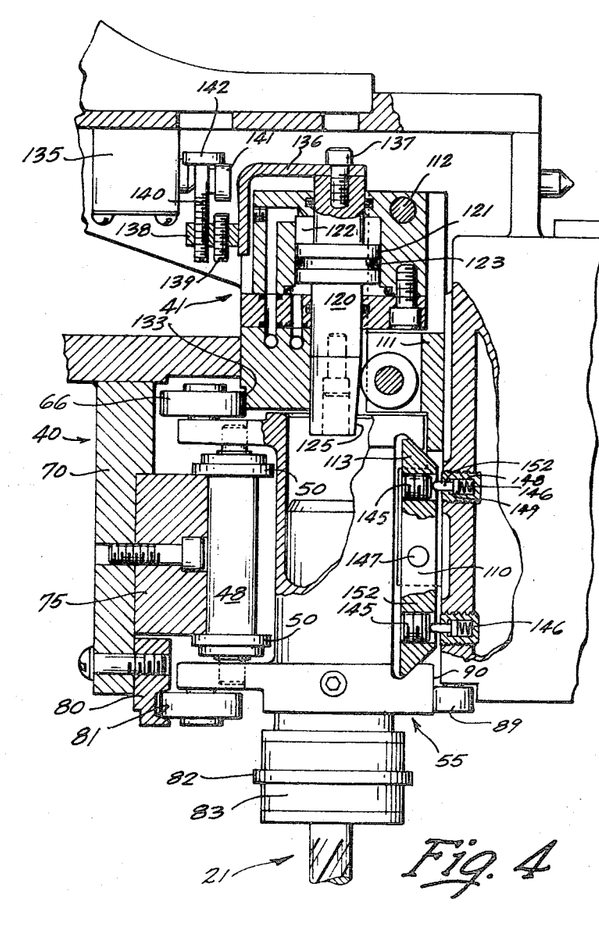
FIG. 4 is a detail view similar to FIG. 3 except that the clamping mechanism is shown actuated to secure the cartridge to the pivotal carrier in readiness for a tool change operation.

In order to enable the carrier 41 to effect the described transfer of the entire cartridge 55 and its associated tool at the tool change station 65, the carrier 41 is provided with a clamping mechanism, or grip, to secure the cartridge 55 to it. To this end, as best seen in FIGS. 3 and 4, the carrier 41 is provided with a clamp member 110 which is supported by an arm 111 that is pivotally mounted on a pin 112. The clamp member 110 is provided with beveled ends 113 and 114 adapted to be received in grooves 115 and 116 that are formed in the side members 57 and 58. The grooves 115 and 116 present inclined surfaces which cooperate with the beveled surfaces of the ends 113 and 114. Thus, as the cartridge 55 moves into the tool change station, the grooves 115 and 116 embrace the beveled ends 113 and 114. After the cartridge 55 is fully located in the tool change station 65, the arm 111 is pivoted about the pin 112 in a counterclockwise direction to force the beveled surfaces 117 and 118 of the clamp member 110 into clamping engagement with the inclined surfaces of the grooves 115 and 116 of the cartridge 55. The view in FIG. 4 illustrates the clamp member 110 shifted to its clamping position with the beveled surfaces 117 and 118 of clamp member 110 in engagement with the inclined surfaces of the grooves 115 and 116 of the cartridge 55.

The clamp member 110 is actuated in its clamping movement by a plunger 120 that is provided with a piston 121 disposed in a hydraulic cylinder 122. The piston 121 is provided with a centrally located peripheral groove for receiving a seal 123 to prevent the escape of hydraulic fluid past the piston. The plunger 120 includes an inclined surface 125 for engagement with a roller 128 that is journalled on a shaft 129 which is rigidly secured to the arm 111.

Hydraulic fluid admitted into a passage 130 directs fluid pressure on the piston 121 to retract the plunger 120 to the position shown in FIG. 3. With the plunger 120 in this position, the clamp member 110 is released and the cartridge 55 is free to move relative to the clamp member 110 and its associated carrier 41.

After the desired tool 21 is accurately located in the tool change station along with its associated cartridge 55, a valve (not shown) is actuated to direct fluid pressure into a passage 131 and to relieve the pressure in the passage 130. The admission of fluid pressure into the passage 131 directs the fluid to the opposite side of the piston 121 for extending the plunger 120 to the position shown in FIG. 4. The movement of the plunger 120 to its extended position, causes the inclined surface 125 to ride along the roller 128 to cause a pivotal movement of the arm 111 about the pin 112 in a counterclockwise direction. This pivoting movement of the arm 111 forces the beveled surfaces 117 and 118 of the clamp member 110 into tight engagement with the inclined surfaces of the grooves 115 and 116 in the cartridge 55 and forces the edge 90 of the side member 58 into tight engagement with the rollers 89. In addition, the two wheels 66 carried by the side member 57 move into tight engagement with a surface 132 formed in a wall 133 which is part of the carrier 41. Therefore, the cartridge 55 at the tool change station 65 is then firmly secured to the carrier 41.

The limits of movement of the plunger 120 are regulated by an adjusting mechanism generally identified by the reference numeral 135 and illustrated in FIGS. 3 and 4. The adjusting mechanism comprises a bracket 136 that is secured to the rear end of the plunger 120 by a screw 137. A plate 138 is rigidly secured to the bracket 136 and is provided with threaded openings for receiving two adjusting screws 139 and 140. Both of the adjusting screws 139 and 140 cooperate with a bumper 141 for regulating the limits of movement of the plunger 120. The end of the adjusting screw 139 abuts the bumper 141 to limit the retracting movement of the plunger 120 which releases the clamp member 110. The adjusting screw 140 extends beyond the bumper 141 and is provided with a head 142 so that when the plunger 120 is extended to actuate the clamp member 110 in its clamping action, the head 142 will abut the bumper 141 to limit the extending movement of the plunger 120.

A double contact limit switch 135, shown in FIGS. 3 and 4, is provided to indicate when the clamp member 110 is in the clamping position and when it is released. To this end, a bracket 136 is secured to the rear end of the plunger 120 by a screw 137. A plate 138 is rigidly secured to the bracket 136 and is provided with threaded openings for receiving two adjustable screws 139 and 140. Both of the adjustable screws 139 and 140 cooperate with a head 141 mounted on the extending end of the actuating lever of the switch 135. When the plunger 120 is retracted to release the clamping member 110 it moves the screw 139 into abutment with the head 141 to move the head 141 in one direction to thereby actuate the switch 135 to close two of its contacts (not shown) to indicate that the clamp member 110 is released. On the other hand, when the plunger 120 is extended to move the clamp member 110 to its clamping position, the plunger 120 moves the adjustable screw 140 with it and causes a head 142 on the screw 140 to abut the head 141 for actuating the switch 135 in the opposite direction and thereby close two other contacts (not shown) in the switch for indicating that the clamping member 110 is in its clamping position.

In order to insure that the clamping member 110 is fully released when the plunger 120 is retracted, a pair of springs 146 located in cylindrical openings 148 act on pistons 149 which are also disposed in the openings 148. The pistons 149 are each provided with an axially extending peg 152 which engage adjustable screws threaded into the clamping member 110. The latter is pivotably supported on a pin 147 and the springs 146 continuously urge the pistons 149 in a direction so that their associated pegs 152 remain in contact with the screws 145. The screws 145 are adjusted relative to the clamping member 110 so that when the plunger 120 is retracted to release the arm 111, the springs 146 will act through the pegs 152 to positively release the clamp member 110 and move it into a position to fully clear the walls of the cartridge 155. The cartridges are then free to move into and out of the tool change station 65 without interference.

After the clamping member 110 is actuated into clamping position, as described above, for securing the selected cartridge 55 to the carrier 41, the piston and cylinder mechanism 105 is energized to extend its piston rod 107. This serves to pivot the carrier 41 in the counterclockwise direction, as viewed in FIG. 5, about the axis 95 from its parked position to its ready position, to locate the tool change arm 45 and the newly selected tool 21 in position for an interchange with the previously used tool 21 disposed in the spindle 20. The piston and cylinder mechanism 105 retains pressure on the carrier 41 to keep the bumper 103 in tight engagement with the adjusting screw 104 during the tool change operation.

TOOL CHANGE ARM

Figures 9, 9A, 10, 10A, 10B, 10C, 10D, 10E:
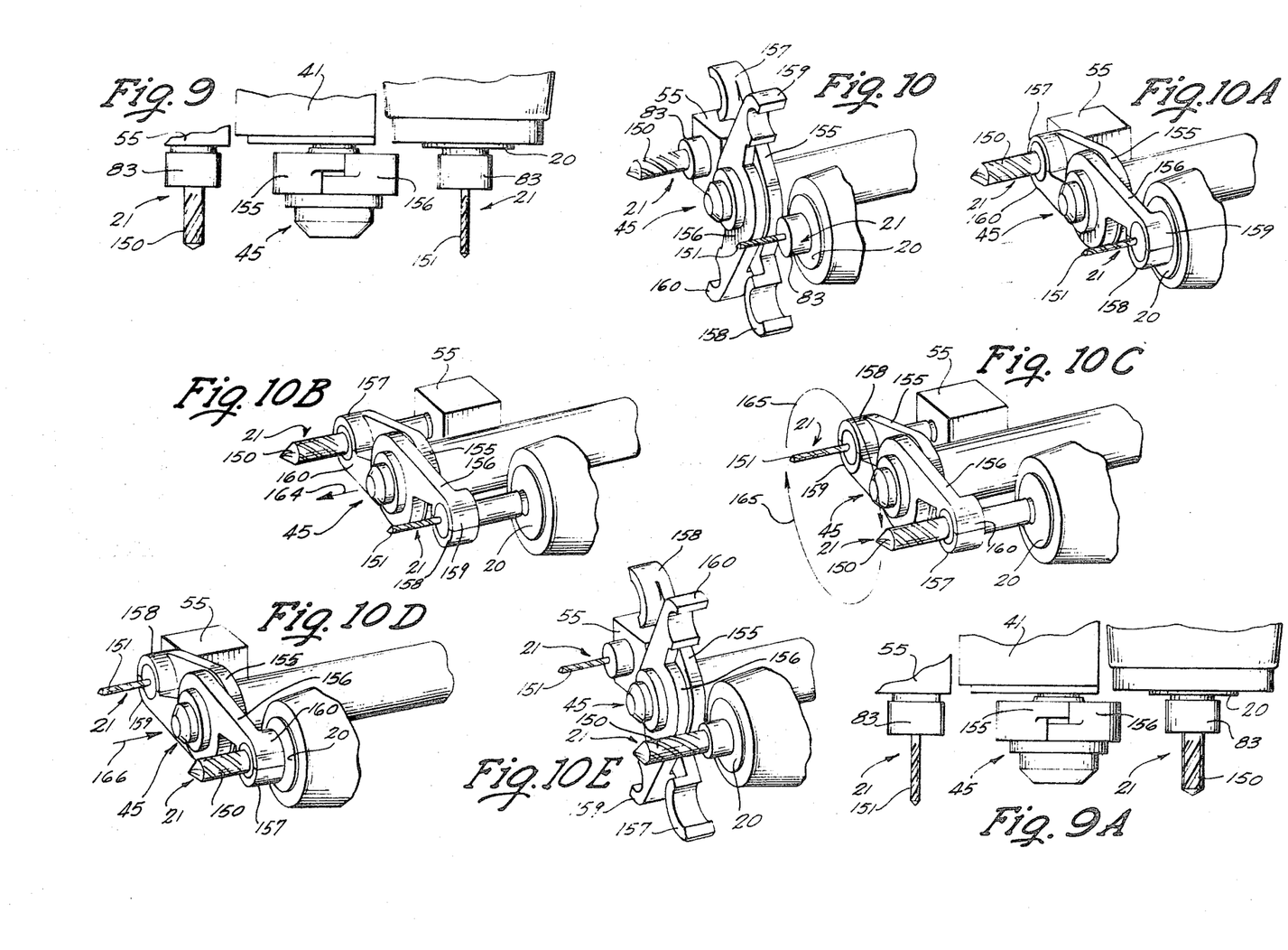

Once the carrier 41 has been properly located in the ready position by the pivotal movement, the tool interchange can take place. As previously mentioned, such interchange is accomplished by actuation of the tool change arm 45. FIG. 9 illustrates the relative positions of the cartridge 55 clamped to the carrier 41, the tool change arm 45, and the spindle 20 when the carrier 41 is in the ready position. The tool change arm 45 is centrally located between the tool 21 in the cartridge 55 and the spindle 20, and is disposed adjacent to the spindle so that the interchange of tools can take place. In FIG. 9, the tool 21 in the cartridge 55 includes an end mill 150 while the tool 21 in the spindle 20 is provided with a drill 151.

The tool change arm 45 is a scissors type which includes two rotary members 155 and 156 that are rotated in unison in opposite directions for producing the simultaneous gripping action of the two tools 21. The sequence of movements of the tool change arm 45 to complete a tool change cycle is illustrated step-by-step in the perspective views in FIGS. 10 to 10E inclusive. Once the tool change cycle has been completed, the two tools 21 will have been interchanged to the locations illustrated in FIG. 9A. Thus, the tool 21 containing the drill 151 will have been transferred from the spindle 20 to the cartridge 55 in the carrier 41, while the tool 21 containing the end mill 150 will have been extracted from the cartridge 55 and transferred to the spindle 20.

As clearly shown in FIG. 10, the rotary member 155 of the tool change arm 45 is provided with a grip 157 at one end and another grip 158 at the opposite end. In like manner, the rotary member 156 is provided with a grip 159 at one end and a grip 160 at the opposite end. The four grips are provided with semicircular recesses and a grip from one rotary member cooperates with a grip on the other rotary member to grip a tool. Thus, the grip 157 on the rotary member 155 cooperates with the grip 160 on the rotary member 156, while the grip 158 on the rotary member 155 cooperates with the grip 159 on the rotary member 156.

The tool change arm 45, the cartridge 55, and the spindle 20 are shown in perspective in FIG. 10 in the same position as they are illustrated in FIG. 9. The tool interchange operation is initiated by rotating the two members 155 and 156 in opposite directions so that the grips 157 and 160 move into gripping engagement with the collar 83 of the tool 21 containing the end mill 150 and which is supported in the cartridge 55. Simultaneously, the two grips 158 and 159 of the rotary members 155 and 156 respectively move into engagement with the collar 83 of the tool 21 that is provided with the drill 151 and which is supported in the spindle 20. This position of the tool change arm 45 is illustrated in FIG. 10A.

With the two tools 21 securely gripped, the entire tool change arm 45 is moved axially away from the cartridge 55 and the spindle 20 to the position shown in FIG. 10B. Such axial movement of the tool change arm 45 is in the direction of the arrow 164 shown in FIG. 10B and is sufficient so that both tools are completely extracted from the cartridge 55 and the spindle 20.

The next operation is to interchange the two tools, and to this end, the tool change arm 45, including both members 155 and 156, are rotated in unison in the direction illustrated by the arrow 165 in FIG. 10C. The arm will be rotated 180° to interchange the positions of the two tools and the view in FIG. 10C illustrates the tool change arm and the two tools 21 after this interchange operation has been completed. It will be noted that the end mill 150 has now been moved from the cartridge 55 to the spindle 20, while the drill 151 has been moved from the spindle 20 to the cartridge 55.

The tools having been interchanged by the 180° rotation of the tool change arm 45, the tool change arm assembly 45 is moved axially toward the cartridge 55 and the spindle 20 in the direction indicated by the arrow 166 in FIG. 10D. This axial movement of the tool change arm 45 serves to insert the tool 21 containing the drill 151 into the cartridge 55 and the tool 21 containing the end mill 150 into the spindle 20. The tool change arm 45 and the two tools 21 are shown in this position in FIG. 10D.

With the new tools inserted into the cartridge 55 and the spindle 20, a spindle tool securing mechanism (not shown) is actuated to secure the tool 21 in operating position. The detent mechanism (not shown) likewise retains the tool 21 containing the drill 151 in the cartridge 55.

The next step in the operation is to return the rotary members 155 and 156 to their idle position as shown in FIG. 10E. This is accomplished by rotating the two members 155 and 156 simultaneously but in opposite directions to the positions shown in FIG. 10E. Such movement serves to release the two tools 21. Upon the completion of each tool change cycle, the rotary members 155 and 156 will be displaced 180° from the positions that they were in when the tool change cycle was initiated. Thus, in FIG. 10E the two grips 158 and 160 are shown at the top of the two rotary members 155 and 156, while in FIG. 10 these two grips are located at the bottom.

The view in FIG. 9A is a plan view showing the cartridge 55, the carrier 41, and the spindle 20 in the same position as they are shown in perspective in FIG. 10E. This view is also identical to that illustrated in FIG. 9 with the exception that the two tools have been interchanged which becomes apparent from an observation of the location of the end mill 150 and the drill 151.

Once the interchange of the two tools 21 is completed, as shown in FIG. 9A, the piston and cylinder mechanism 105 can be actuated to retract the piston rod 107 and thereby pivot the carrier 41 back to its parked position. This will serve to insert the cartridge 55 back into the tool storage magazine 40 with its legs 61 in engagement with the pins 49 of the chain 46 so that the cartridge is coupled to the chain 46 to be driven by it in the path of travel within the magazine 40. When the cartridge 55 is thus returned to the magazine 40 by the pivotal movement of the carrier 41, the clamp member 110 is released to the position shown in FIG. 3 so that the cartridge 55 is free to move with the chain 46.

The scissors type of tool change arm 45 has been illustrated in the present application. The drive mechanism for actuating it is enclosed within the carrier 41 but a description of it has been omitted inasmuch as it is not a part of the present invention. For a complete description of the drive mechanism for actuating the tool change arm 45 in a tool change cycle, reference is made to co-pending patent application.

From the foregoing detailed description of the illustrative embodiments set forth herein to exemplify the present invention, it will be apparent that there has been provided an improved tool change mechanism which operates with utmost efficiency for transferring a tool and is especially well-adapted for bodily reorientating a tool 90° during the tool transfer operation to accommodate the most efficient positioning of the tool storage magazine with respect to the operating spindle, and which also serves to transfer the tools over relatively long distances and yet maintain the work station completely clear for a work operation after the tool change operation has been completed.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

The principles of this invention having now been fully explained in connection with the foregoing description, we hereby claim as our invention:

1. In a machine tool;
    a frame;
    a cutter carrying spindle supported by said frame;
    a tool storage magazine carrying a plurality of tools to be used in said spindle for work operations;
    a carrier movably carried by said frame;
    a tool change arm supported by said carrier for movement with it as well as for movement relative to it in a tool change operation;
    securing means on said carrier for securing a selected tool in said magazine to said carrier;
    means for moving said carrier to extract the secured tool from said magazine and position it and the tool change arm in a ready position adjacent to said spindle; and
    means for actuating said tool change arm relative to said carrier in a tool change operation for interchanging the tools in said spindle and on said carrier while the carrier is in the ready position.

2. A machine tool according to claim 1 wherein said securing means comprises a grip on said carrier and including,
    a plurality of cartridges movably supported by said magazine with each of said cartridges removably carrying a tool for use in said spindle;
    gripping means on each of said cartridges for engagement with the grip on said carrier so that actuation of said carrier operates to extract the gripped cartridge with the desired tool from said magazine and move the cartridge and the tool carried therein to the ready position; and
    said tool change arm extracts the selected tool from the cartridge at the ready position and transfers it to said spindle.

3. A machine tool according to claim 2 including,
    a tool change station in said magazine;
    drive means in said magazine connected to move said cartridges sequentially to said tool change station;

means for terminating the actuation of said drive means when a selected tool arrives at the tool change station; and retaining means for retaining said cartridges in engagement with said drive means, said retaining means being interrupted at said tool change station to enable said carrier to extract the cartridge at the tool change station from the magazine for transfer to the ready position.

4. A machine tool according to claim 3 wherein said carrier is movable between a parked position and the ready position; and means on said carrier to retain the cartridges at the tool change station in engagement with said drive means when said carrier is in its parked position so that said cartridges can pass through the tool change station without being displaced from said magazine.

5. A machine tool according to claim 3 wherein as each of said cartridges moves into said tool change station its gripping means moves into cooperating relationship with the grip on said carrier; and grip actuating means on said carrier to actuate said carrier grip into operating engagement with the grip on said cartridge to secure the cartridge containing the selected tool to said carrier for extraction from said magazine and transfer to the ready position.

6. A machine tool according to claim 1 wherein said carrier is pivotably carried by said frame for pivotal movement between a parked position and the ready position with the carrier being normally located in the parked position; and including power means for pivoting said carrier to the ready position in preparation for an interchange of tools, said power means returning said carrier to the parked position after the interchange has been completed to return the tool removed from said spindle to said magazine.

7. A machine tool according to claim 1 wherein said magazine is provided with a tool change station from which the new tools are removed for transfer to the spindle and to which the previously used tools from the spindle are returned;

and including retaining means in said magazine for retaining said tools therein, said retaining means being interrupted at the tool change station to render the tools at the tool change station removable; and second retaining means on said carrier disposed at the tool change station for retaining the tools in said magazine so that the tools can pass through the tool change station.

8. A machine tool according to claim 2 wherein said tool storage magazine is provided with a tool change station from which said carrier extracts the next selected tools from said magazine and to which it returns the previously used tools to said magazine;

a continuous chain supported in said magazine for movement in a specific path of travel;

power means actuating said chain for movement in its path of travel;

means coupling said cartridges to said chain for movement with it in said path of travel, said chain moving said cartridges sequentially into said tool change station;

a control for regulating the operation of said chain to terminate its movement when the next desired tool arrives in the tool change station;

means actuating said grip on said carrier to grip the cartridge at the tool change station; and power means energizable to actuate said carrier in its movement for uncoupling the gripped cartridge from said chain and extracting it from said magazine for location at the ready station so that the tool contained in said cartridge may be transferred to said spindle.

9. A machine tool according to claim 8 including, retaining means in said magazine for retaining said cartridges coupled to said chain for movement therewith, said retaining means being interrupted at the tool change station so that said carrier can uncouple the cartridge at the tool change station from said chain and extract it from said magazine.

10. A machine tool according to claim 9 wherein said carrier is movable between a parked position and the ready position and is normally in the parked position in which it grips the cartridge containing a newly selected tool for transfer to the ready position; and second retaining means on said carrier operable when said carrier is in its parked position to retain the cartridge passing through said tool change station coupled to said chain so that said cartridges may travel through the tool change station until the cartridge containing the newly selected tool arrives at the tool change station.

11. In a machine tool;

a frame;

a work station for performance of work operations;

a tool storage magazine carrying a plurality of tools for use in said work station to perform the work operations;

a carrier movably carried by said frame;

a tool transfer member supported by said carrier for movement with it as well as for movement relative to it for the performance of a tool transfer operation;

securing means on said carrier for securing a selected tool in said magazine;

means for moving said carrier to a ready position and thereby extract the secured tool from said magazine and position it and said tool transfer member in the ready position adjacent to said work station; and means for actuating said tool transfer member relative to said carrier in a tool transfer operation for transferring the tool from said carrier into said work station while said carrier is disposed in the ready station.

12. A machine tool according to claim 11 wherein said securing means comprises a grip;

said carrier is movable between a parked position and the ready position with the carrier being normally located in the parked position;

and said tool storage magazine is provided with a tool change station from which said carrier extracts the newly selected tools from said magazine and to which it returns the previously used tools to said magazine;

and including a plurality of cartridges movably supported by said magazine with each of said cartridges removably carrying a tool for use at the work station;

power means connected to move said cartridges in a predetermined path of travel in said magazine with the cartridges being moved sequentially into said tool change station;

a control for regulating the operation of said power means to terminate movement of said cartridge when the cartridge containing the next desired tool arrives at the tool change station;

gripping means on each of said cartridges for engagement with the grip on said carrier, said gripping means moving into cooperating relationship with the grip on said carrier when its associated cartridge moves into the tool change station;

grip actuating means on said carrier to actuate said carrier grip into operating engagement with the grip on the cartridge at the tool change station to secure the cartridge containing the next desired tool to said carrier for extraction from said magazine and transfer to the ready position; and when said carrier is in the ready position said tool transfer member extracts the tool from the gripped cartridge and transfers it to said work station.

13. A machine tool according to claim 12 including, coupling means on said cartridges for coupling said cartridges to said power means for movement by said power means in the established path of travel;

retaining means on said magazine for retaining said coupling means in driving engagement with said power means, said retaining means being interrupted at the tool change station so that said carrier can receive the cartridge located at the tool change station; and second retaining means on said carrier operable when said carrier is in the parked position to retain said coupling means in engagement with said power means at the tool change station so that said cartridges can pass through the tool change station without being uncoupled from said power means until the selected tool arrives at the tool change station.

14. A machine tool according to claim 12 wherein said power means for moving said cartridges is a continuous chain supported in said magazine for movement in a specific path of travel;

a source of power connected to actuate said chain for movement in its path of travel;

coupling means connecting said cartridges to said chain for movement with it in said path of travel, said chain moving said cartridges sequentially into said tool change station;

retaining means on said magazine retaining said coupling means in engagement with said chain, said retaining means being interrupted at the tool change station to permit said carrier to uncouple the cartridge at the tool change station from said chain and remove it from said magazine for movement to the ready position; and second retaining means on said carrier operable when said carrier is in the parked position to retain said coupling means in engagement at the tool change station so that said cartridges can pass through the tool change station without being uncoupled from said chain until the next desired tool arrives at the tool change station.

* * * * *